US008472545B2

(12) United States Patent
Wu et al.

(10) Patent No.: US 8,472,545 B2
(45) Date of Patent: Jun. 25, 2013

(54) METHOD AND SYSTEM FOR MANAGING PRECODING IN A MULTI-USER WIRELESS COMMUNICATIONS SYSTEM

(75) Inventors: Gang Wu, Shanghai (CN); Ni Ma, Shanghai (CN); Xiaobo Zhang, Shanghai (CN)

(73) Assignee: NXP B.V., Eindhoven (NL)

( * ) Notice: Subject to any disclaimer, the term of this patent is extended or adjusted under 35 U.S.C. 154(b) by 478 days.

(21) Appl. No.: 12/681,891

(22) PCT Filed: Oct. 10, 2008

(86) PCT No.: PCT/IB2008/054185
§ 371 (c)(1),
(2), (4) Date: May 3, 2010

(87) PCT Pub. No.: WO2009/047739
PCT Pub. Date: Apr. 16, 2009

(65) Prior Publication Data
US 2010/0254473 A1    Oct. 7, 2010

(30) Foreign Application Priority Data
Oct. 12, 2007  (CN) .......................... 2007 1 0181175

(51) Int. Cl.
*H04B 7/08* (2006.01)
*H04B 7/02* (2006.01)

(52) U.S. Cl.
USPC .............................. 375/267; 455/69; 455/517

(58) Field of Classification Search
USPC ............ 375/221, 260, 262, 265, 267; 455/24, 455/513, 517, 67.13, 69
See application file for complete search history.

(56) References Cited

U.S. PATENT DOCUMENTS

| | | | |
|---|---|---|---|
| 2004/0157567 A1* | 8/2004 | Jootar et al. | 455/101 |
| 2005/0227697 A1* | 10/2005 | Borst et al. | 455/450 |
| 2006/0034165 A1 | 2/2006 | Levy | |
| 2007/0191066 A1* | 8/2007 | Khojastepour et al. | 455/562.1 |
| 2007/0201575 A1 | 8/2007 | Ariyavisitakul et al. | |
| 2007/0254597 A1* | 11/2007 | Li et al. | 455/69 |
| 2007/0254602 A1* | 11/2007 | Li et al. | 455/88 |

FOREIGN PATENT DOCUMENTS

| | | |
|---|---|---|
| EP | 1 816 758 A2 | 8/2007 |
| WO | 2004/042982 A2 | 5/2004 |

OTHER PUBLICATIONS

Zhou, Q., et al "Joint Tomlinson-Harashima Precoding and Scheduling for Multiuser MIMO with Imperfect Feedback"; IEEE Wireless Communications and Networking Conference, pp. 1233-1238 (Apr. 2006).

Castro, P., et al "Adaptive Precoding In MIMO Wireless Communication Systems Using Blind Channel Prediction Over Frequency Selective Fading Channels"; IEEE/Sp 13$^{th}$ Workshop on Statistical Signal Processing, pp. 173-178 (Jul. 2005).

Spiteri, S., et al; "Prediction for Time-Varying SVD Systems"; 15$^{th}$ IEEE Intl. Symposium on Personal, Indoor and Mobile Radio Communications, vol. 3, pp. 1608-1612 (Sep. 2004).

(Continued)

*Primary Examiner* — Young T. Tse

(57) ABSTRACT

Operating a wireless communications system that supports multi-user multiple-input multiple-output (MU-MIMO) communications between a base station and multiple mobile stations involves generating a channel estimation, predicting a future channel estimation from the channel estimation, precoding data in response to the predicted future channel estimation, and transmitting the precoded data.

10 Claims, 5 Drawing Sheets

OTHER PUBLICATIONS

Nguyen, H., et al. "Prediction of the Eigenvectors for Spatial Multiplexing MIMO Systems in Time-Varying Channels"; Proc. of the 5th IEEE Intl. Symposium on Signal Processing and Information Technology, pp. 119-124 (Dec. 2005).

Zhou, et al. "How Accurate Channel Prediction Needs to be for Transmit-Beamforming with Adaptive Modulation Over Rayleigh MIMO Channels?"; IEEE Trans. on Wireless Communications, vol. 3, No. 4, pp. 1285-1294(Jul. 1, 2004) (identified as Giannakis in ISR).

International Search Report and Written Opinion for International Patent Appln. PCT/IB2008/054185 (Apr. 6, 2009).

D. J. Love and R. W. Heath Jr., "Limited Feedback Unitary Precoding for Spatial Multiplexing Systems," IEEE Transactions Information Theory, vol. 51, pp. 2967-2976, Aug. 2005.

R1-050889, Samsung, "MIMO for Long Term Evolution", 3GPP TSG RAN WG1 Meeting #42, London, UK, Aug. 2005.

3GPP TR 25.876, "Multiple-Input Multiple output in UTRA" V1.8.0 (Oct. 2005).

R1-051314, Texas Instruments, Performance of pre-coded MIMO and per group rate control for OFDMA E-UTRA, RAN1#43, Seoul, Korea, Nov. 7-11, 2005.

R1-070293, Single user throughput simulation results for non-codebook based pre-coding in EUTRA TDD 3GPP TSG RAN WG1 Meeting #47bis, Sorrento, Italy, Jan. 15-19, 2007.

3GPP TS 36.211, "Physical Channels and Modulation" V1.1.0 (May 2007).

* cited by examiner

METHOD AND SYSTEM FOR MANAGING PRECODING IN A MULTI-USER WIRELESS COMMUNICATIONS SYSTEM

The invention relates generally to wireless communications systems, and more particularly, to managing the precoding of wireless transmissions in a multi-user wireless communications network.

The 3$^{rd}$ Generation Partnership Project (3GPP) was established to produce globally applicable technical specifications and technical reports for a 3$^{rd}$ generation mobile system based on evolved Global System for Mobile communications (GSM) core networks and the radio access technologies that they support (i.e., Universal Terrestrial Radio Access (UTRA) in both Frequency Division Duplex (FDD) and Time Division Duplex (TDD) modes). The scope was subsequently amended to include the maintenance and development of the GSM technical specifications and technical reports including evolved radio access technologies (e.g., General Packet Radio Service (GPRS) and Enhanced Data rates for GSM Evolution (EDGE)). 3GPP Long Term Evolution (LTE) is a project within the 3GPP to improve the Universal Mobile Telecommunication System (UMTS) mobile phone standard.

In wireless communications systems such as the systems being standardized through the 3GPP, precoding is used to improve channel quality and throughput. Conventional precoding typically relies on channel estimations that are made using recently received information (e.g., recently received pilot symbols). Although the channel estimations may accurately reflect the actual past channel responses, the channel estimations are backward-looking only. Because transmission conditions tend to vary over time, subsequent transmissions may exhibit different channel responses, which in turn may limit or negate the benefits of precoding.

In accordance with an embodiment of the invention, instead of precoding directly from channel estimations, previously generated channel estimations are used to predict future channel estimations, and the precoding is accomplished in response to the predicted future channel estimations instead of directly from the previously generated channel estimation. Because precoding is accomplished in response to a prediction about future channel estimations instead of directly from the previously generated channel estimations, which reflect past channel conditions, the precoding can be better matched to conditions that will be experienced in subsequent transmissions.

In an embodiment, a method for operating a wireless communications system that supports multi-user multiple-input multiple-output (MU-MIMO) communications between a base station and multiple mobile stations involves generating a channel estimation, predicting a future channel estimation from the channel estimation, precoding data in response to the predicted future channel estimation, and transmitting the precoded data.

In another embodiment, a base station that supports MU-MIMO communications between the base station and multiple mobile stations includes a channel estimator configured to generate a channel estimation from received symbols, a channel estimation predictor configured to predict a future channel estimation from the channel estimation, a precoder configured to precode data in response to the predicted future channel estimation, and a transmitter configured to transmit the precoded data.

In another embodiment, a mobile station that supports MU-MIMO communications between a base station and the mobile station includes a channel estimator configured to generate a channel estimation from received symbols, a channel estimation predictor configured to predict a future channel estimation from the channel estimation, a precoding scheme selector configured to select a precoding scheme in response to the predicted future channel estimation, and a transmitter configured to transmit an indication of the precoding scheme to a base station.

Other aspects and advantages of the present invention will become apparent from the following detailed description, taken in conjunction with the accompanying drawings, illustrating by way of example the principles of the invention.

Throughout the description, similar reference numbers may be used to identify similar elements.

Figure 1:
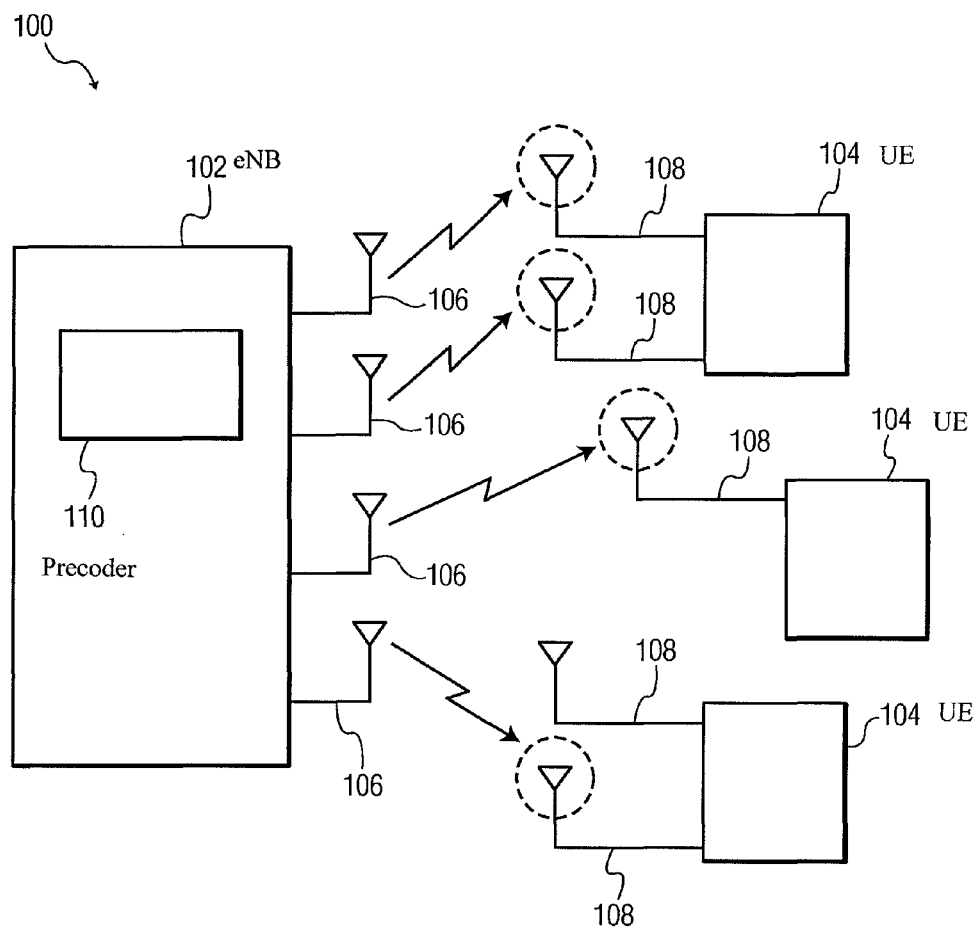
FIG. 1 depicts a wireless communications system that supports MU-MIMO communications between a base station and multiple mobile stations.

Multi-user multiple-input multiple-output (MU-MIMO) is an advanced spatial multiplexing technique for wireless transmission. FIG. 1 depicts a wireless communications system 100 that includes a base station 102 (referred to herein as an evolved Node B (eNB)) and multiple mobile stations 104 (referred to herein as user equipments (UEs)). The wireless communications system is operated in MU-MIMO mode using frequency division duplexing (FDD) or time division duplexing (TDD). In the embodiment of FIG. 1, the eNB is a wireless communications base station that supports MU-MIMO operation as specified in the 3GPP LTE specification. The eNB includes four antennas 106 although the eNB can include more than four antennas. In the embodiment of FIG. 1, the UEs are wireless communications mobile stations that support wireless operation as specified in the 3GPP LTE specification. The UEs may have one or two antennas 108, although the UEs are not limited to two antennas (e.g., the UEs can include more than two antennas).

In the embodiment of FIG. 1, the eNB 102 includes a precoder 110 for precoding downlink transmissions. Generally, precoding involves independently weighting the signals that are transmitted from the eNB to maximize channel throughput. Conventionally, precoding is accomplished directly from channel estimations. In accordance with an embodiment of the invention, instead of precoding directly from channel estimations, previously generated channel estimations are used to predict future channel estimations, and precoding is accomplished in response to the predicted future channel estimations instead of directly from the previously generated channel estimations. Because precoding is accomplished in response to predictions about future channel estimations instead of channel estimations that reflect the actual past conditions, the precoding can be better matched to conditions that will be experienced in subsequent transmissions.

Two categories of precoding include codebook based precoding and non-codebook based precoding. An embodiment of the invention that is applicable to codebook based precoding is described below with reference to FIGS. 2 and 3 and an embodiment of the invention that is applicable to non-codebook based precoding is described below with reference to FIG. 4.

Codebook Based Precoding

Codebook based precoding is a technique that enables precoding information to be efficiently sent in a wireless communication, typically in the uplink direction from a UE to an eNB. The technique involves establishing a codebook that includes a set of precoding matrices, with each precoding matrix in the set being uniquely identifiable by a codebook index. In operation, a transmitter (e.g., the eNB 102) transmits data such as pilot symbols to a receiver (e.g., a UE 104). The UE uses the pilot symbols to generate a channel estimation and the channel estimation is used by the receiver to select one of the precoding matrices from the set of precoding matrices. Typically, the precoding matrix that maximizes the channel throughput is selected. Once a precoding matrix is selected, the corresponding codebook index is transmitted back to the eNB and the eNB uses the selected precoding matrix to precode subsequent downlink transmissions. The UE may also generate channel quality information, for example, as channel quality indicators (CQIs), and provide the CQIs to the eNB along with the codebook indexes. The codebook index(s) and CQIs are then used by the eNB to establish a precoding scheme.

An exemplary codebook based precoding scheme is referred to as the Per-User Unitary Rate Control (PU$^2$RC) scheme. In a PU$^2$RC scheme that operates in a MIMO system with M transmit antennas at the eNB, a set of precoding matrices, i.e. codebook $E=\{E^{(0)} \ldots E^{(G-1)}\}$, is adopted. Given the set of precoding matrices, the gth precoding matrix can be expressed as: $E^{(g)}=[e_0^{(g)} \ldots e_{M-1}^{(g)}]$, and $e_m^{(g)}$ is the mth precoding vector in the set of precoding matrices.

In operation, each UE 104 generates a channel estimation and calculates a CQI value for each vector in each matrix in the set E. Each UE also selects a preferred precoding matrix, which can be identified by a codebook index. The codebook index and the CQIs are then fed back to the eNB 102. The eNB gathers the feedback information, which indicates the index of a preferred precoding matrix and the CQIs for all the precoding vectors in the matrix. The eNB then groups the UEs that identify the same preferred precoding matrix, and selects a group with the highest group priority among the different groups. At the same time, inside the selected precoding group, the eNB allocates each precoding vector to the user with the highest priority. Finally, the eNB establishes a precoding scheme that corresponds to the selected group.

In an embodiment, the precoding vectors in one precoding matrix can be assigned to multiple users or multiple streams of the same user. In another embodiment, the precoding matrix can be set to a unitary matrix, which can mitigate the interference between the different transmit antennas because of the orthogonality between the different precoding vectors in the precoding matrix.

Figure 2:
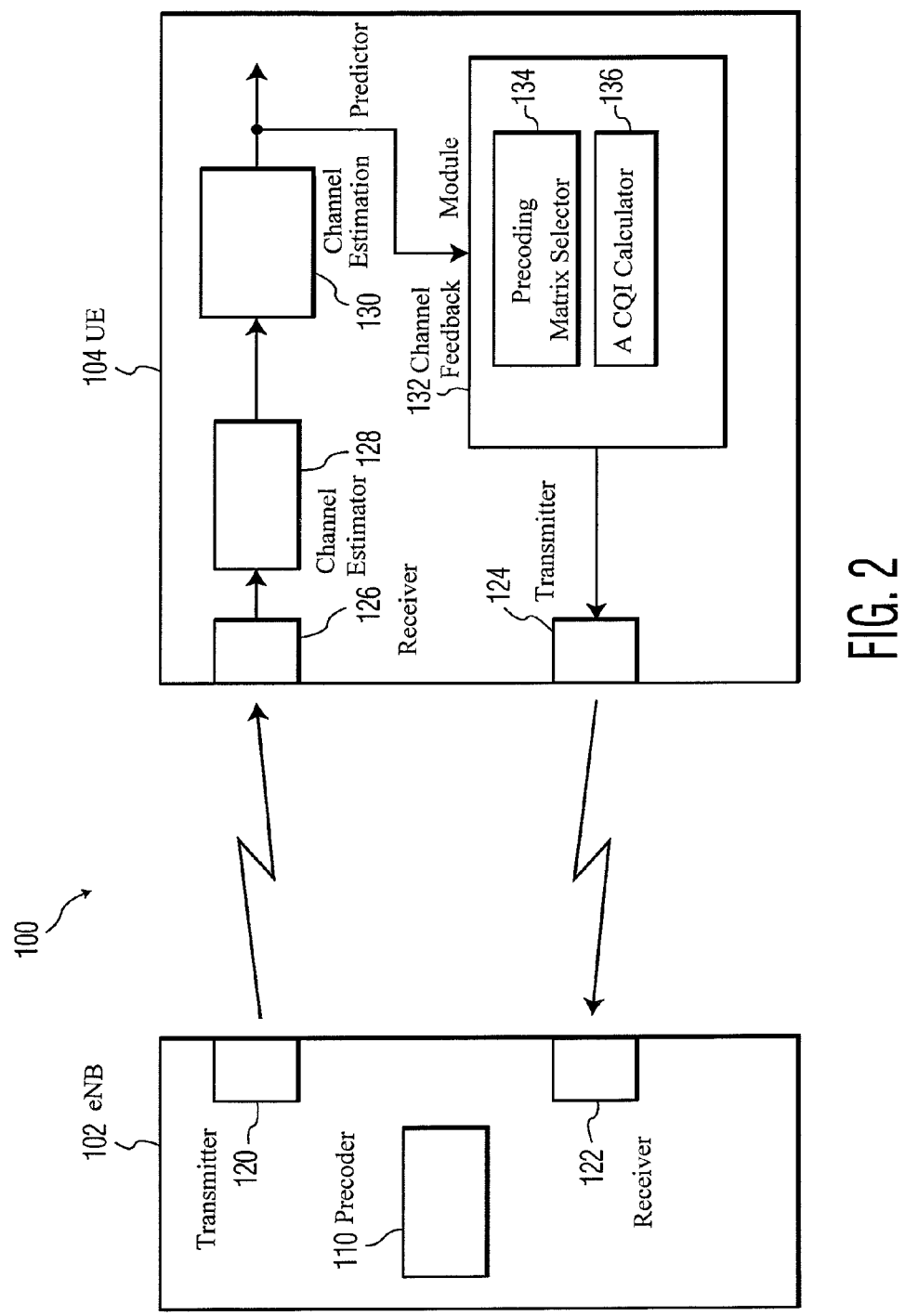
FIG. 2 depicts a wireless communications system that includes an evolved node B (eNB) and a user equipment (UE), where the UE is configured to predict a future channel estimation.

In accordance with an embodiment of the invention, when using codebook based precoding, the channel estimation that is made at a particular UE is used to predict a future channel estimation and the predicted future channel estimation, instead of the previously generated channel estimation, is used to select a precoding matrix and to calculate CQIs. FIG. 2 depicts a wireless communications system that includes an eNB 102 and a UE 104, where the UE is configured to predict future channel estimations. The eNB includes a transmitter 120, a receiver 122, and a precoder 110 that is configured to precode data according to a codebook based precoding scheme that is selected in response to a predicted future channel estimation. The UE includes a transmitter 124, a receiver 126, a channel estimator 128, a channel estimation predictor 130, and a channel feedback module 132. The channel feedback module includes a precoding matrix selector 134 and a CQI calculator 136. The transmitter and receiver of the UE support wireless communications. The channel estimator generates a channel estimate from received signals, the channel estimation predictor generates a predicted future channel estimation from the channel estimation, and the channel feedback module uses the predicted future channel estimation to select a precoding matrix, to identify the corresponding codebook index, and to calculate CQIs. The UE transmits the codebook index and the CQIs to the eNB for use in precoding subsequent downlink transmissions.

Operation of the system is now described in more detail with reference to FIG. 2. Referring first to the operation of the channel estimator 128, assume that there are M transmit antennas (not shown) and N receive antennas (not shown) in the wireless communications system and that a pilot signal transmitted at the mth transmit antenna is referred to as $s_m$. The pilot signal, $s_m$, is distinguished from the pilot signals at the other antennas by their different time or frequency allocations. The channel response at the mth transmit antenna and the nth receive antenna for the kth UE is expressed as: $h_{m,n,k}$, for $k=1, \ldots, K$, where K is the number of UEs. The received signal for the kth UE can be expressed as:

$$y_{m,n,k} = s_m h_{m,n,k} + \eta_{m,n,k} \quad (1)$$

where $\eta_{m,n,k}$ is the noise. Generating a channel estimation involves finding the value of $h_{m,n,k}$. The basic process for finding the value of $h_{m,n,k}$ involves multiplying $y_{m,n,k}$ by $(s_m s_m^*)^{-1} s_m^*$, where the superscript * and −1 represent conjugation and inverse, respectively. This process can be expressed as:

$$\hat{h}_{m,n,k} = (s_m s_m^*)^{-1} s_m^* y_{m,n,k} \quad (2)$$

In an embodiment, a channel estimation for the kth UE is expressed in a channel response matrix as:

$$\hat{H}_k = \begin{bmatrix} \hat{h}_{1,1,k} & \ldots & \hat{h}_{M,1,k} \\ \vdots & \ldots & \vdots \\ \hat{h}_{1,N,k} & \ldots & \hat{h}_{M,N,k} \end{bmatrix} \quad (3)$$

The SNR of each precoding vector is calculated as the follows:

$$SNR_k = \frac{e_k^H \hat{H}_k^H \hat{H}_k e_k}{\sigma_k^2} \quad (4)$$

where $e_k$ is the precoding vector and $\sigma_k^2$ is the mean of the noise variance. The CQI is obtained from the value of SNR.

Referring again to FIG. 2, the channel estimation, $\hat{h}_{m,n,k}$, from the channel estimator 128 is provided to the channel estimation predictor 130. The channel estimation predictor predicts what the channel estimation will be in the future based on the received channel estimations. The predicted future channel estimation at time, t, is identified as $\hat{h}_{m,n,k}(t)$. Channel estimation predictions can be made using different techniques. One technique for predicting a future channel estimation involves filtering, including, for example, adaptive filtering or non-adaptive filtering. Adaptive filtering tracks variations in the channel response based on statistical characteristics derived from filter inputs. Adaptive filtering techniques include, for example, least mean square (LMS) filtering, recursive least square (RLS) filtering, and Kalman filtering.

Figure 3:
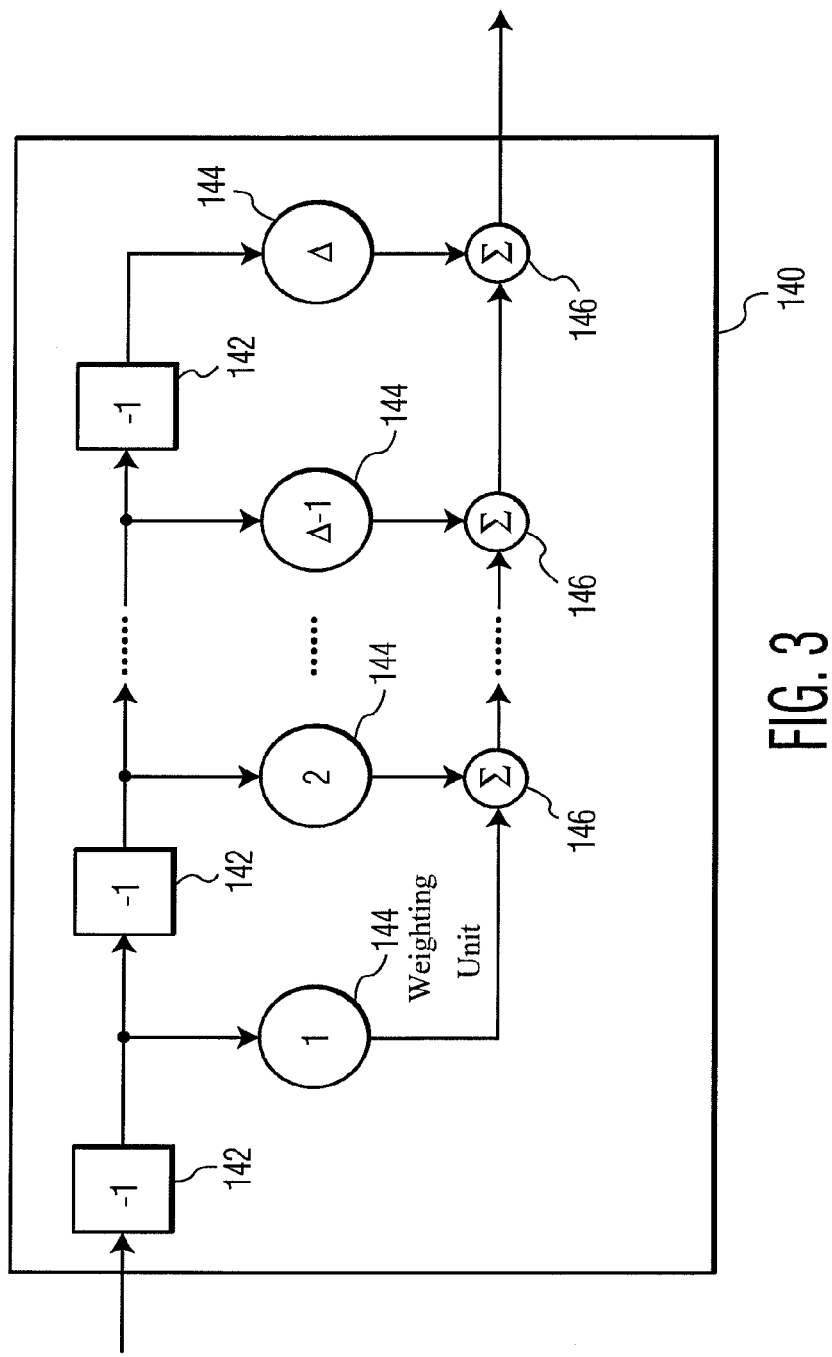
FIG. 3 depicts a non-adaptive filter for use in predicting a future channel estimation.

Non-adaptive filtering utilizes real-time information about the wireless propagation channel to update filter coefficients. An example of a non-adaptive prediction filter is described with reference to FIG. 3. In particular, FIG. 3 depicts a linear transversal prediction filter 140 that includes transversal units 142, weighting units 144, and summing units 146. The prediction filter operates to generate the predicted future channel estimate at time, t, based on the previously generated channel estimations.

Referring to FIG. 3, the filter operates to predict a future channel estimation, $\tilde{h}_{m,n,k}(t)$, by using the channel estimations that were previously generated at a series of past times, $\hat{h}_{m,n,k}(t-1)$, $\hat{h}_{m,n,k}(t-2)$, ..., $\hat{h}_{m,n,k}(t-\Delta)$. Using the filter of FIG. 3, the calculation of the predicted future channel estimation is represented as:

$$\tilde{h}_{m,n,k}(t) = \sum_{i=1}^{\Delta} w_i \hat{h}_{m,n,k}(t-i) \quad (5)$$

In an embodiment, the filter coefficients, $w_i$, can be obtained using the Wiener-Hopf equation:

$$w_1 = R^{-1} p \quad (6)$$

where R is the expectation mean of the auto-correlation matrix of vector $\hat{h}_{m,n,k} = [\hat{h}_{m,n,k}(t-1), \hat{h}_{m,n,k}(t-2), \ldots, \hat{h}_{m,n,k}(t-\Delta)]$ and p is the expectation of the cross correlation between $\hat{h}_{m,n,k}$ and the desired response $\hat{h}_{m,n,k}(t-1)$. Although one filtering technique for predicting a future channel estimate is described with reference to FIG. 3, other techniques can be used to predict a future channel estimate.

Once the channel estimation predictor 130 generates a predicted future channel estimation, the predicted future channel estimation is provided to the channel feedback module 132. The precoding matrix selector 134 of the channel feedback module uses the predicted future channel estimation to select a precoding matrix and to identify the corresponding codebook index. The CQI calculator 136 of the channel feedback module uses the predicted future channel estimation to calculate CQIs for the UE 104. Precoding matrix information (e.g., in the form of the corresponding codebook index) and the CQIs are then transmitted uplink to the eNB 102 for use in precoding.

Non-Codebook Based Precoding

As mentioned above, another embodiment of the invention involves using predicted future channel estimates in a system that utilizes non-codebook based precoding. Non-codebook based precoding involves generating precoding matrices directly from the channel estimations. One non-codebook based technique for precoding utilizes singular value decomposition (SVD) to generate precoding matrices from channel estimations. In an embodiment, assuming M transmit antennas and N receive antennas, a channel estimation, as represented by the channel response matrix for the kth UE, can be expressed as:

$$H_k = \begin{bmatrix} h_{1,1,k} & \cdots & h_{M,1,k} \\ \vdots & \cdots & \vdots \\ h_{1,N,k} & \cdots & h_{M,N,k} \end{bmatrix} \quad (7)$$

The singular value decomposition of the channel response matrix is expressed as:

$$H_k = U_k \Lambda_k V_k^H \quad (8)$$

where, $U_k$ will be adopted in the receiving processing, i.e., as:

Transmit signal: $S_k$
Precoded signal: $X_k = V_k S_k$
Received signal: $Y_k = H_k X_k$
Processed signal: $R_k = U_k^H Y_k = \Lambda_k S_k$ and $\Lambda_k$ is a rectangular matrix whose diagonal elements are non-negative real numbers and whose off-diagonal elements are zeros. The diagonal elements $\lambda_1 \geq \lambda_2 \geq \ldots \geq \lambda_q$ are the ordered singular values of the matrix $H_k$, where q=min (M, N). $V_k$ is used as the precoding matrix, which is weighted for the kth user. In an embodiment, precoding effectively converts the MIMO channel into a set of parallel flat fading sub-channels.

Figure 4:
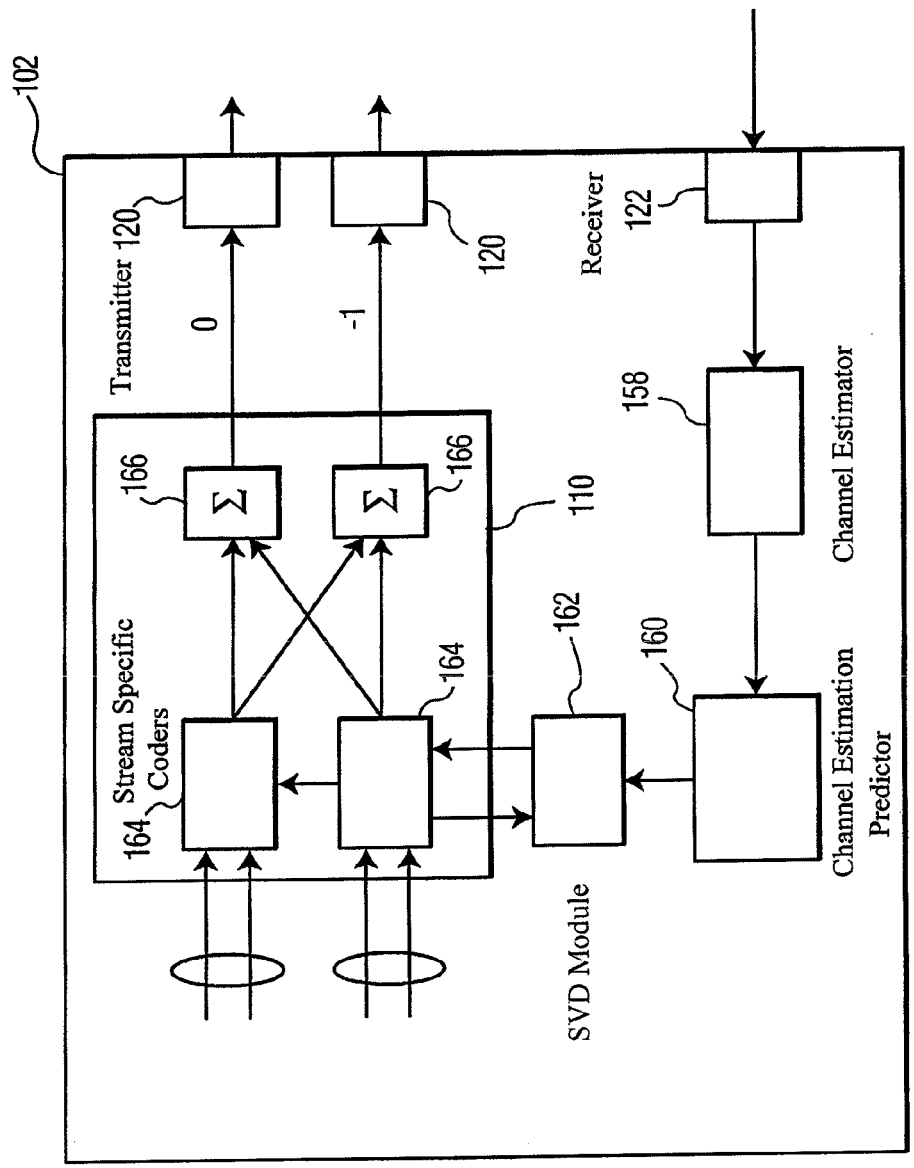
FIG. 4 depicts an embodiment of an eNB that is configured to implement precoding in response to predicted future channel estimates using singular value decomposition (SVD).

In accordance with an embodiment of the invention, channel estimates are used to generate predicted future channel estimations and the predicted future channel estimations, instead of the previously generated channel estimations, are used in an SVD operation to generate precoding matrices. FIG. 4 depicts an embodiment of an eNB 102 that is configured to implement precoding in response to predicted future channel estimations using singular value decomposition. The eNB depicted in FIG. 4 includes transmitters 120, a receiver 122, a channel estimator 158, a channel estimation predictor 160, an SVD module 162, and a precoder 110. The channel estimator and channel estimation predictor are similar to those described with reference to FIGS. 2 and 3 and the SVD module performs singular value decompositions as described above. The precoder includes stream-specific coders 164 and summers 166, although other coder configurations are possible.

In operation, the channel estimator 158 generates channel estimations from the information received via an uplink channel. For example, the channel estimator uses known techniques to generate channel estimations. The channel estimations are provided to the channel estimation predictor 160, which uses the channel estimations to predict future channel estimations. As described above, the channel estimation predictor may utilize, for example, adaptive or non-adaptive filtering techniques to generate the predicted future channel estimations. The predicted future channel estimations generated by the channel estimation predictor are then provided to the SVD module 162 for use in singular value decomposition. The SVD module generates precoding matrices, e.g., precoding matrices $V_1$-$V_K$, directly from the predicted future channel estimations and the precoding matrices are used by the precoder 110 to precode subsequent downlink transmissions. The above-described technique takes advantage of channel reciprocity between the eNB and UEs in the TDD wireless communications system, wherein channel reciprocity involves essentially equivalent channel responses in the uplink and downlink directions.

Figure 5:
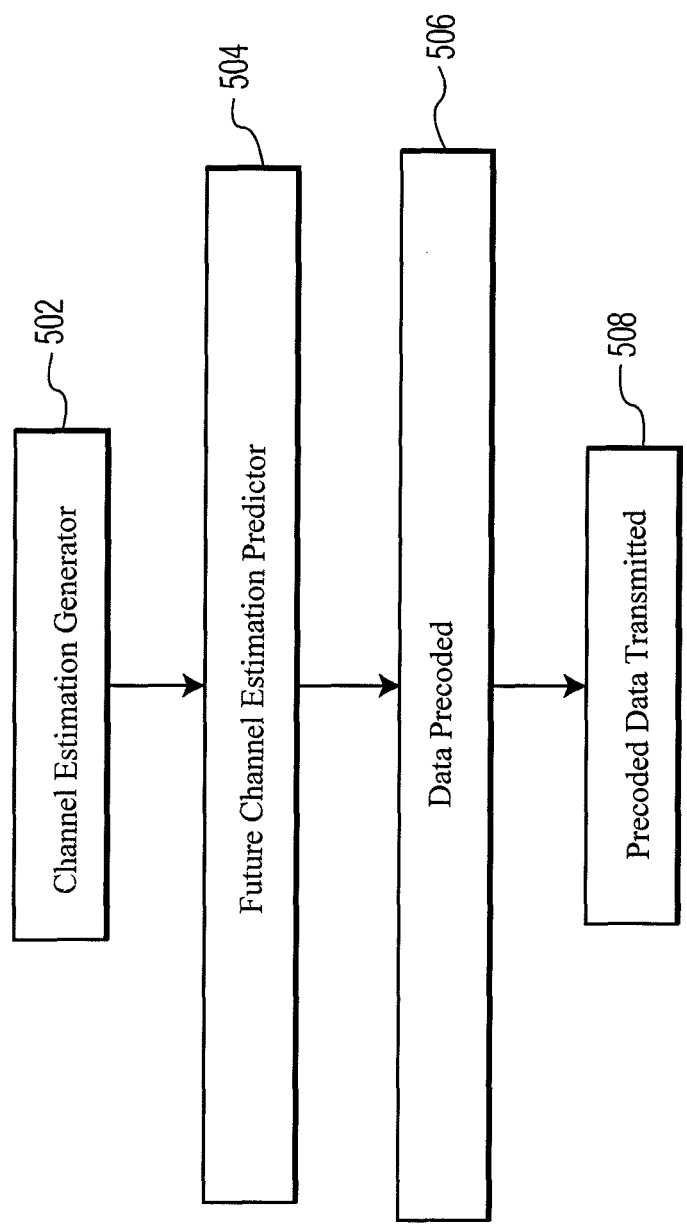
FIG. 5 is a process flow diagram of a method for operating a wireless communications system that supports multi-user wireless communications between a base station and multiple mobile stations.

FIG. 5 is a process flow diagram of a method for operating a wireless communications system that supports multi-user wireless communications between a base station and multiple mobile stations. At block 502, a channel estimation is generated. At block 504, a future channel estimation is predicted from the channel estimation. At block 506, data is precoded in response to the predicted future channel estimation. At block 508, the precoded data is transmitted.

Although specific embodiments of the invention have been described and illustrated, the invention is not to be limited to the specific forms or arrangements of parts as described and illustrated herein. The invention is limited only by the claims.

What is claimed is:

1. A method for operating a wireless communications system that supports multi-user multiple-input multiple-output (MU-MIMO) communications between a base station and multiple mobile stations, the method comprising:
   generating a channel estimation;
   predicting a future channel estimation from the channel estimation;
   precoding data in response to the predicted future channel estimation; and
   transmitting the precoded data, wherein precoding the data in response to the predicted future channel estimation includes identifying a precoding scheme in response to the predicted future channel estimation.

2. The method of claim 1 wherein identifying the precoding scheme includes selecting a precoding matrix in response to the predicted future channel estimation.

3. The method of claim 2 wherein selecting the precoding matrix includes selecting a codebook index in response to the predicted future channel estimation.

4. A method for operating a wireless communications system that supports multi-user multiple-input multiple-output (MU-MIMO) communications between a base station and multiple mobile stations, the method comprising:
   generating a channel estimation;
   predicting a future channel estimation from the channel estimation;
   precoding data in response to the predicted future channel estimation; and
   transmitting the precoded data, wherein precoding the data in response to the predicted future channel estimation includes performing a singular value decomposition (SVD) on the predicted future channel estimation and precoding the data in response to the SVD.

5. The method of claim 4 further comprising generating a precoding matrix in response to the SVD.

6. A method for operating a wireless communications system that supports multi-user multiple-input multiple-output (MU-MIMO) communications between a base station and multiple mobile stations, the method comprising:
   receiving symbols related to a channel;
   generating channel response information from the received symbols;
   predicting future channel response information in response to the channel response information;
   precoding data in response to the predicted future channel response information; and
   transmitting the precoded data, wherein precoding the data in response to the predicted future channel response information includes identifying a precoding scheme in response to the predicted future channel response information and precoding the data in response to the identified precoding scheme.

7. The method of claim 6 wherein identifying the precoding scheme includes selecting a precoding matrix in response to the predicted future channel response information.

8. The method of claim 7 wherein selecting the precoding matrix includes selecting a codebook index in response to the predicted future channel response information.

9. A base station that supports multi-user multiple-input multiple-output (MU-MIMO) communications between the base station and multiple mobile stations, the base station comprising:
   a channel estimator configured to generate a channel estimation from received symbols;
   a channel estimation predictor configured to predict a future channel estimation from the channel estimation;
   a precoder configured to precode data in response to the predicted future channel estimation;
   a transmitter configured to transmit the precoded data; and
   a singular value decomposition (SVD) module configured to generate a precoding matrix in response to the predicted future channel estimation;
   wherein the precoder is configured to precode data in response to the precoding matrix from the SVD module.

10. A mobile station that supports multi-user multiple-input multiple-output (MU-MIMO) communications between a base station and the mobile station, the mobile station comprising:
    a channel estimator configured and arranged to generate a channel estimation from received symbols;
    a channel estimation predictor configured and arranged to predict a future channel estimation from the channel estimation;
    a precoding scheme selector configured and arranged to select a precoding scheme in response to the predicted future channel estimation; and
    a transmitter configured and arranged to transmit an indication of the precoding scheme to the base station,
    wherein the precoding scheme selector is further configured to select a precoding matrix in response to the predicted future channel estimation, and
    the precoding scheme selector is further configured to select a codebook index that identifies the selected precoding matrix.

* * * * *